US006345963B1

(12) United States Patent
Thomin et al.

(10) Patent No.: US 6,345,963 B1
(45) Date of Patent: Feb. 12, 2002

(54) PUMP WITH POSITIVE DISPLACEMENT

(75) Inventors: Georges Thomin, Rebigue; Guy Laffeta, Cugnaux; Marc Anduze, Aussonne; Robert Caen, Frouzins; Stéphane Colin, Toulouse; Jean-Charles Mare, Odars, all of (FR)

(73) Assignee: Centre National d 'Etudes Spatiales (C.N.E.S.), Paris Cedex (FR)

( * ) Notice: Subject to any disclaimer, the term of this patent is extended or adjusted under 35 U.S.C. 154(b) by 0 days.

(21) Appl. No.: 09/581,682
(22) PCT Filed: Dec. 14, 1998
(86) PCT No.: PCT/FR98/02722
  § 371 Date: Jun. 16, 2000
  § 102(e) Date: Jun. 16, 2000
(87) PCT Pub. No.: WO99/31388
  PCT Pub. Date: Jun. 24, 1999

(30) Foreign Application Priority Data

Dec. 16, 1997 (FR) ............................................. 97 15958

(51) Int. Cl.⁷ ............................ F04B 43/00; F04B 45/02
(52) U.S. Cl. ........................ 417/412; 417/472; 417/534
(58) Field of Search ................................ 417/472, 534, 417/412, 418; 92/34, 45

(56) References Cited

U.S. PATENT DOCUMENTS 1,789,611 A * 1/1931 Van Ranst .................. 417/472
2,797,646 A   7/1957 Pomykata
3,508,848 A   4/1970 Schmidlin
3,657,930 A   4/1972 Jacobson
4,421,464 A  12/1983 Schmidt et al.
4,585,397 A   4/1986 Crawford et al.
5,881,919 A * 3/1999 Womac et al. ........... 417/413.1
6,024,345 A * 2/2000 Nishio ....................... 417/472

OTHER PUBLICATIONS

G.C. Birar et al., "Integrated Pump Assebly—An Active Cooling System for Mars Pathfinder Thermal Control", *SAE Technical Paper*, Series 961489, pp. 1–8, Jul. 1997.

"Cours de Technologie Spatiale", *Architecture Mécanique et Thermique*, Teoulouse, Cépaduès Editions, 1994, pp. 437–453.

* cited by examiner

*Primary Examiner*—Charles G. Freay
(74) *Attorney, Agent, or Firm*—Young & Thompson

(57) ABSTRACT

A pump with positive displacement for pumping and entrainment of a fluid in piping (3), includes a cylinder (6) which contains deformable pumping bellows (12) which separate two pumping chambers, a driver (34, 29) which is associated with the pumping unit (12) and has an actuator unit (29) inside the cylinder (6) which is connected to the pumping unit (12), and coils (34) for transmission of drive energy to the actuator (29) from outside the cylinder (6), and a manifold (2) with vortex fluid diodes, which is designed to control the global direction of pumping and flow of the fluid in the piping (3).

8 Claims, 7 Drawing Sheets

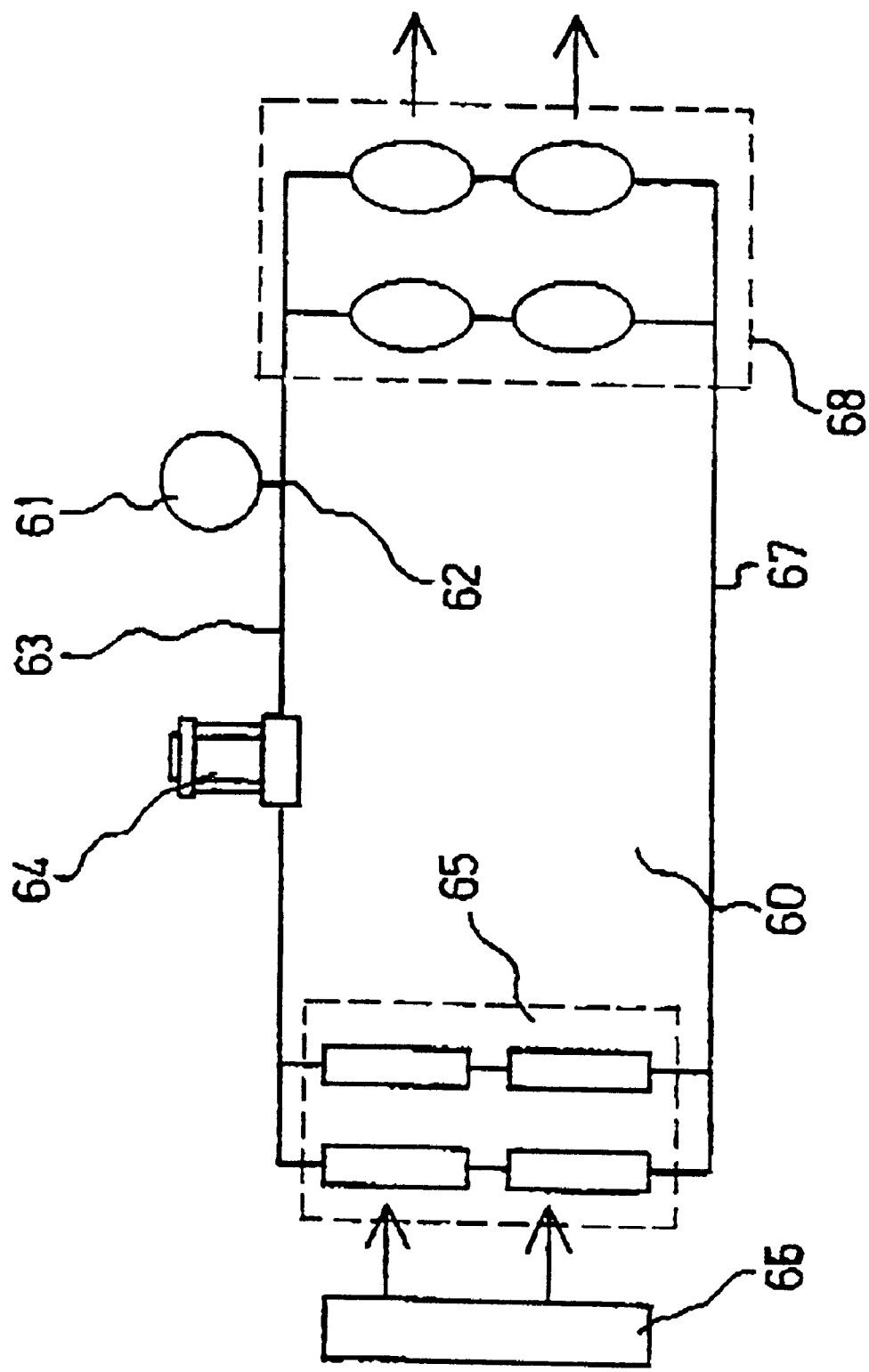

PUMP WITH POSITIVE DISPLACEMENT

CROSS REFERENCE TO RELATED APPLICATION

This is the 35 USC 371 national stage of international application PCT/FR98/02722 filed on Dec. 14, 1998, which designated the United States of America.

BACKGROUND OF THE INVENTION

The invention relates to a pump with positive displacement for pumping and entrainment of a fluid in piping.

It extends to a device for thermal control of the components of a space system, such as an artificial satellite or a space station with a long service life.

Use of space systems with a long service life such as unmanned commercial satellites (for telecommunications, scientific or observation purposes etc.) or space stations, and in particular orbital stations, is tending to become considerably more frequent. As a consequence, the constraints of industrial production and cost are becoming increasingly important, as opposed to technical performance alone.

In particular, these space systems incorporate components, and in particular electronic components, which emit heat and have to be cooled, and dissipate increasingly high levels of power (with power densities which develop accordingly), and which must be kept within ever narrower temperature ranges. The distances of transport between the hot source and the cold source are also increasing. The conventional passive thermal control means (in particular by conduction or radiation) are thus insufficient.

When use of thermal conduction and radiation is insufficient, the known thermal control devices on board the satellites consist in general of heat pipes. In fact, heat pipes have the advantage of greater reliability and a longer service life than those of mechanical pumps. In fact, it should be noted that in a satellite, the service life of the equipment must be assured for several years, before launching takes place. Conventionally, this service life must be approximately ten to fifteen years.

However, heat pipes have disadvantages: in order to test them on the ground, they need to be placed on a low gradient which does not necessarily correspond to the configuration of flight, which detracts from the representativity of the tests; their dimensions need to be made to measure for integration in each space system; their rigidity is a constraint which causes problems during integration, which is sometimes difficult, or even impossible; they are very sensitive to the non-condensable gases which they produce, and their efficiency and characteristics are considerably affected by these non-condensable gases; and they have a low capacity for transporting thermal power.

In addition to heat pipes, thermal control devices have also been proposed which comprise one or a plurality of loops of heat-transfer fluid, associated with a pumping device of the capillary or mechanical type.

Pumping devices of a capillary type have a low transport capacity (limited flow rate and manometric height), in particular for tests on the ground in the presence of gravity; they are complex to start; and their tolerance for extreme operating modes is low (when the power to be transported becomes very low, or in the presence of non-condensable gases).

Mechanical pumping devices in the form of a centrifugal pump have been used in practice in certain manned missions (shuttles, capsules, stations etc) for operation of loops which use monophasic heat-transfer fluid.

In the very rare cases of unmanned missions where mechanical pumping has been selected, there has also been option for a centrifugal pump. Thus, the publication "Integrated Pump Assembly—An Active Cooling System for Mars Pathfinder Thermal Control" Gajanana C. Birar et al, SAE TECHNICAL PAPER SERIES 961489 pp1–8, 26th International Conference on Environmental Systems, Monterey, Calif., Jul. 8–11, 1996, explains that use of a positive displacement pump was rejected, in favour of a centrifugal pump, for the thermal control loop of the Mars "Pathfinder" probe. This probe was qualified for a service life of a few months.

In addition, a centrifugal pump is not appropriate in the case of a diphasic fluid loop for a space system such as a commercial satellite, since pumps of this type have high electrical consumption, a large size, and a high cost.

Pumps with positive displacement (U.S. Pat. No. 2,797,646, U.S. Pat. No. 4,585,397, U.S. Pat. No. 4,421,464) incorporate many moving parts in dynamic contact (pumps with a reciprocal displacement pumping unit, such as a piston or deformable unit) which are subject to wear, in particular the intake and output valves of the manifold and the parts for transmission of movement to the pumping unit, the service life of which cannot be determined on the ground other than by service life duration tests, which in general are statistical. The performance levels of this type of pump also vary considerably according to the wear, and thus deteriorate over a period of time. In addition, these pumps generate significant stresses on the materials, as well as vibrations and unbalanced forces.

In particular, U.S. Pat. No. 4,421,464 describes a pump pumping liquid helium, comprising bellows which are actuated by an electromagnetic motor, which is totally immersed in the liquid helium. Since the mobile part of the pump and of the motor are connected by flexible electrical connections, and the valves are diaphragm valves, a pump of this type cannot be qualified for space applications with a long service life. In addition, it is not applicable to pumping of fluids such as heat-transfer fluids (for example ammonia) of the diphasic fluid thermal control loops for space systems, with which the components of the motor are not compatible.

Thus, hitherto, it has been considered that pumps with positive displacement cannot be qualified for space applications with a long service life.

In addition, pumping of a thermal control heat-transfer fluid, in particular in a loop with a diphasic fluid, of a space system, requires particularly stringent performance levels, including: a pumping height of several metres, high resistance to static pressure (which can be as much as $160.10^5$ Pa, with permanent deformation, and $80.10^5$ Pa without permanent deformation), a flow rate of several grammes per second, and a reduced energy consumption and size. In addition, it must be possible to vary the power to be transported within an extensive range, and to regulate the flow rate easily (i.e. using an electronic system which is simple, reliable and has a small size).

Thus, the hydrostatic pressure generator described by U.S. Pat. No. 3,657,930, the pumping unit of which consists of a piezoelectric crystal, does not fulfil these criteria, since the amplitude of displacement of a pumping unit of this type is not sufficient. In addition, in this case also, flexible electrical connections must be provided in order to supply the crystal with electrical energy through the wall of the cylinder, thus causing problems of service life. Also, U.S. Pat. No. 3,508,848 describes a single-effect diaphragm pump, with vortex fluid diodes, which is actuated by a pneumatic oscillator. This solution therefore requires a pneumatic external alternative pressure source, to which the aforementioned problems of suitability and service life apply, and which does not make it possible to achieve the above-described performance levels.

In practice therefore, no mechanical pump exists which can be qualified for a long service life, and is designed to be able to be integrated in a space system, and in particular an unmanned commercial satellite or a space station, for pumping of a thermal control heat-transfer fluid, in particular in a diphasic fluid loop.

In particular, even if use of diphasic fluid thermal control loops is theoretically possible in unmanned commercial satellites, practical implementation of these loops is impeded by the fact that there is no corresponding qualified pump.

SUMMARY OF THE INVENTION

The object of the invention is thus to eliminate these disadvantages, and to provide a pump with positive displacement which can be integrated in a space system such as a satellite or a space station, and the service life of which in space can be guaranteed on the ground for several years, and in particular for at least ten years.

The object of the invention is also to provide a pump of this type, which more particularly is designed for pumping of a thermal control heat-transfer fluid, and in particular a diphasic heat-transfer fluid of a diphasic fluid loop, for example ammonia.

The object of the invention is also in particular to propose a pump which permits use of diphasic fluid thermal control loops in unmanned commercial satellites or space stations.

The object of the invention is more particularly to propose a pump of this type which has a reduced size and weight, and in particular dimensions of approximately a decimetre for a weight of approximately a kilogramme; the operating characteristics of which remain stable in the long term; which provides a one-way flow, the value of which can easily be piloted, and can be as much as several grammes per second or several cubic centimetres per second, without requiring complex electronic regulation; which provides a pumping height which can be as much as several metres; which can withstand a high static pressure (of up to $160.10^5$ Pa with permanent deformation, and $80.10^5$ Pa without permanent deformation); which has a low energy consumption, and in particular less than 15W; and which has a structure which is simple, robust and inexpensive.

For this purpose, the invention relates to a pump with positive displacement for pumping and entrainment of a fluid in piping, comprising:

at least one cylinder which contains deformable pumping bellows which separate two pumping chambers in this cylinder, one of the pumping chambers being formed inside the bellows, whereas the other is formed outside the bellows, this cylinder being delimited by a wall which is hermetically sealed, with the exception of apertures for intake/output of the fluid, which open into each of the pumping chambers;

drive means which are associated with the bellows, and are designed to deform the latter and displace it reciprocally in the cylinder, the volumes of the two pumping chambers varying in opposition, these drive means comprising at least one ferromagnetic and/or magnetised actuator unit which is disposed inside the cylinder, and is connected to the bellows in order to deform and displace the latter, and coil means, which are disposed outside the wall of the cylinder, for transmission of electromagnetic drive energy by induction to this actuator unit from outside the cylinder, these drive energy transmission means being without a part which passes through the wall of the cylinder, and in particular a mobile part which gives rise to production of dynamic solid friction; and a manifold with fluid diodes of the vortex type, which is without a mobile unit valve, is connected to the piping and to the intake/output apertures, and is designed to control the global direction of pumping and flow of the fluid in the piping, during reciprocal deformations and displacements of the bellows in the cylinder.

Throughout the text, the following terminology is used:

cylinder: any enclosure which is delimited by a wall (in one or several parts), irrespective of its shape and dimensions;

fluid diode: any device through which a fluid can pass, and which, owing to its shape, has resistance to the flow of the fluid in one direction which is greater than the resistance to the flow of the fluid in the other direction; the fluid diode is said to be "through-putting" in the direction in which it offers the least resistance;

dynamic solid friction: contact friction between at least two solids which are in movement relative to one another;

volumes varying in opposition: one volume increases by a value when the other decreases simultaneously by the same value.

Advantageously and according to the invention, the pumping bellows consist of a single deformable piece. These bellows can be made of metal.

In addition, advantageously and according to the invention, the actuator unit is disposed in an extension of the pumping chamber, which is disposed outside the bellows.

The bellows may or may not be symmetrical in revolution around their main axis.

Advantageously and according to the invention, the actuator unit comprises a ferromagnetic and/or magnetised part, which is accommodated in the cylinder, in particular in an extension of one of the two pumping chambers, and which is connected by a rod to an end wall of the pumping bellows, such that this part of the actuator unit and this end wall are integral in translation in the cylinder. The said part, the rod and the end wall of the bellows are accommodated entirely in the cylinder.

In addition, advantageously and according to the invention, the drive means are designed to control the pumping unit at a frequency of between 1 Hz and 50 Hz, and in particular between 1 Hz and 1 Hz.

In addition, advantageously and according to the invention, the pump comprises means for guiding in translation of the actuator unit in the cylinder, consisting of flexible plates, the axial rigidity of which (i.e. according to the axis of expansion and contraction of the bellows) is less than that of the pumping bellows. These means for guiding are also accommodated entirely in the cylinder, are supported on the wall of the cylinder, and are designed not to produce any dynamic solid friction. Since they function solely with axial flexure, they are without any mobile part which would give rise to dynamic solid friction of this type.

Advantageously and according to the invention, interposed between each pumping chamber and a suction end of the piping, the manifold comprises an upstream fluid diode which is through-putting towards the corresponding pumping chamber, and, interposed between each pumping chamber and a delivery end of the piping, a downstream fluid diode, which is through-putting towards the delivery end, such that the pump is of the double-effect type.

According to the invention, the fluid diodes of the manifold are of the vortex type, i.e. they comprise a main cavity which is globally symmetrical in revolution, a first, intake aperture which opens axially into the cavity, and a second, output aperture, which opens tangentially into the cavity.

Since the vortex fluid diodes do not have any solid/solid dynamic contact, they are without a mobile part and deformable portions. They are therefore entirely, perfectly static.

In addition, advantageously and according to the invention, the manifold comprises an upstream accumulator cavity, which receives the fluid from the suction end of the piping, and a downstream accumulator cavity, from which the fluid is delivered towards the delivery end of the piping, and the fluid diodes are interposed between the accumulator cavities and the intake/output apertures in the pumping chambers. These accumulator cavities make it possible to compensate for any instantaneous variations in the global flow rate in the piping.

The invention additionally relates to a device for thermal control of the components of a space system, such as a satellite or a space station, comprising a diphasic heat-transfer fluid loop, and at least one pump according to the invention.

The pump according to the invention is entirely without any mobile part which is in solid/solid contact, or which undergoes dynamic solid friction. Thus, its service life can easily be determined on the ground, in particular by means of accelerated tests, and this service life is substantial, and in particular approximately several years.

In addition, the pump according to the invention is advantageously a double-effect bellows pump, which provides a relatively regular flow rate, and little vibration, in which the bellows are subjected to balanced pressure stresses on both sides of the deformable pumping unit, and have low energy consumption. Their characteristics remain constant in the long term.

A pump according to the invention can easily be produced in a form which is suitable for integration of the pump in a space system such as an unmanned commercial satellite. It is extremely simple, has a small size, and is inexpensive. It has high performance levels which are compatible with those of thermal control devices such as the diphasic fluid loops of the space systems.

A pump according to the invention is thus particularly well-suited for pumping the fluid of a diphasic heat-transfer fluid of a thermal control loop. In particular, its flow rate can easily be piloted, for example by adjusting the operating frequency of the bellows. In addition, the real flow rate which is delivered by the pump varies little according to the variations of losses of load in the piping.

The invention also extends to a pump and a thermal control device, characterised in combination by all or some of the characteristics described previously or hereinafter.

BRIEF DESCRIPTION OF THE DRAWING

Other objectives, characteristics and advantages of the invention will become apparent from reading the following description with reference to the attached figures, and in which:

FIG. 9 is a diagram which illustrates the principle of a thermal control device according to the invention.

DESCRIPTION OF THE PREFERRED EMBODIMENTS

Figure 1:
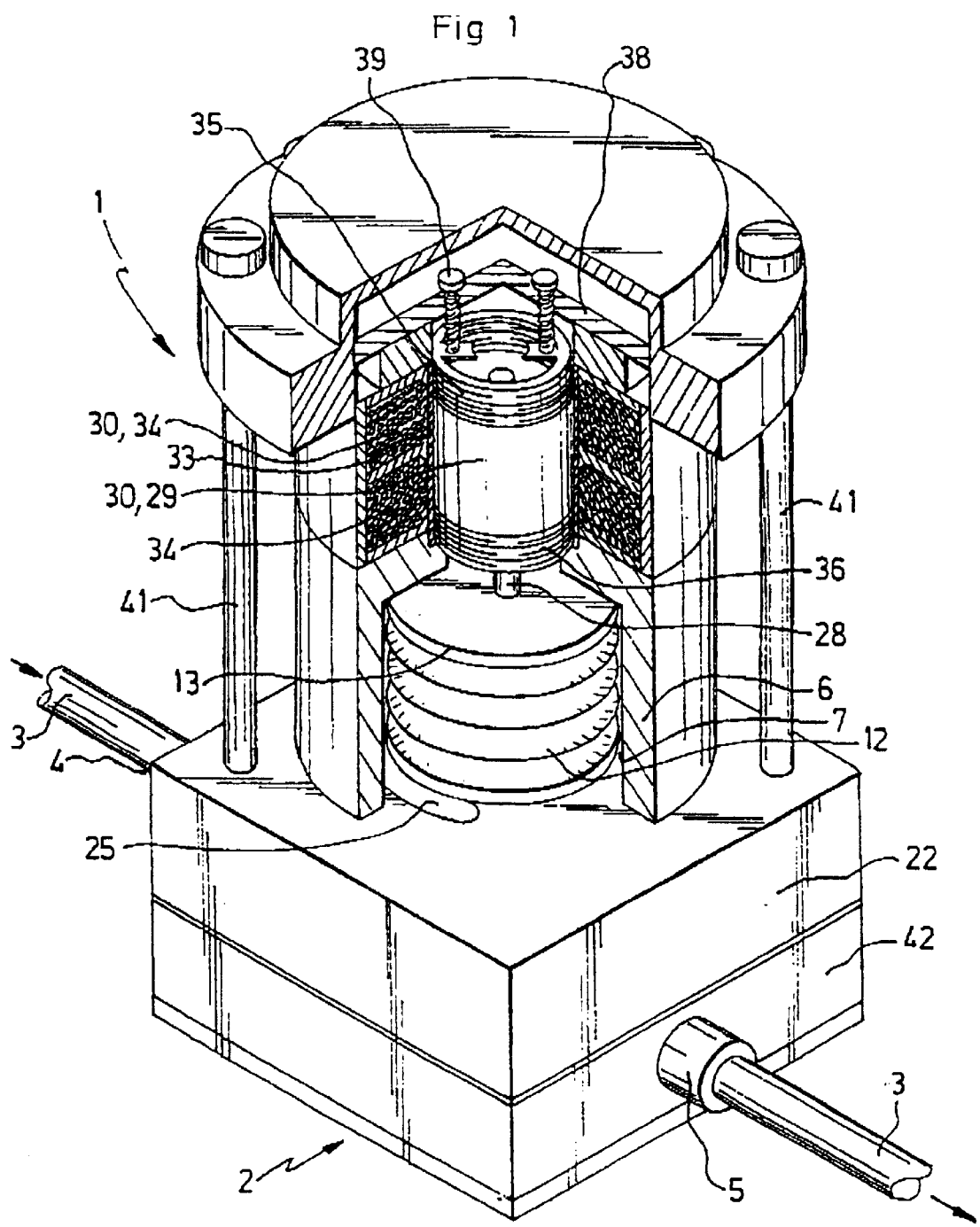
FIG. 1 is a schematic, perspective, partially cut-out view of a pump according to an embodiment of the invention provided by way of non-limiting example.

The pump shown in the figures comprises a pump body 1 and a manifold 2 which are interposed on piping 3. The pump permits pumping and delivery of a fluid in the piping 3, which is connected to the manifold 2, firstly by a suction end 4, via which the fluid reaches the manifold 2, and secondly via a delivery end 5, from which the fluid is discharged under pressure from the manifold 2.

The pump body 1 comprises a cylinder 6 which is delimited by a wall 7 which is hermetically sealed with the exception of apertures 23, 25 for intake/output of the fluid. This wall 7 can be formed by a single continuous surface of a single part (which for example is foundry-cast), or, as in the example shown, it can be obtained from assembly of several parts to one another.

The cylinder 6 contains deformable bellows 12, which are disposed in the cylinder 6, such as to separate two pumping chambers 10, 11 in the cylinder 6, i.e. a chamber 10 outside the bellows 12, and a chamber 11 inside the bellows 12. The cylinder 6 and the bellows 12 are preferably symmetrical, and in particular symmetrical in revolution, relative to a single main axis.

The bellows 12 are advantageously made of metal, and consist either of a single machined part, or of an assembly of identical Belleville washers, which are stacked one on another coaxially head to tail, and are welded edge to edge on the interior and exterior. The bellows 12 comprise a plurality of folds 18 and an end wall 13, which covers the final fold. In addition, the bellows 12 comprise a base 14 for fitting of the latter onto the wall 7 of the cylinder 6, and more specifically onto a portion 15 of this wall 7 which forms the base of the cylinder 6 which is oriented towards the manifold 2. The base 14 of the bellows 12 is generally in the form of a flange, i.e. it has a ring 16 which is welded to the first fold or which extends it, and a skirt 17 which extends the ring 16 axially opposite the folds 18 of the bellows 12. A fitting plate 19 is associated with the axial end of the skirt 17, by radial screws 20 for fitting this plate 19 onto the skirt 17. The fitting plate 19 is provided with an axial internal screw thread, which makes it possible to accommodate a screw 21 for securing of the bellows 12.

The pump body 1 comprises a base plate 22 which in particular forms the base 15 of the cylinder 6, and is provided with a receptacle to accommodate the base 14 of the bellows 12. The screw 21 for securing the bellows 12 is engaged axially in a corresponding receptacle in the base plate 22, from below, such that it can be introduced into the axial internal screw thread of the fitting plate 19, which has the effect of placing the ring 16 against the base 15. Gaskets can be provided if necessary, for example a toric seal between the ring 16 and the base 15.

The skirt 17 and/or the fitting plate 19 comprise at least one aperture 23, which puts the inner pumping chamber 11 of the bellows 12 into communication with a cavity 24 opposite, which is provided in the base plate 22. In addition, an aperture 25 is provided outside the bellows 12, through the base 15, in order to put the outer pumping chamber 10 into communication with a cavity 26 opposite, which is provided in the base plate 22. The aperture 23 acts as an intake/output aperture for the fluid, which opens into the inner pumping chamber 11. The aperture 25 acts as an intake/output aperture for the fluid, which opens into the outer pumping chamber 10.

Figure 2:
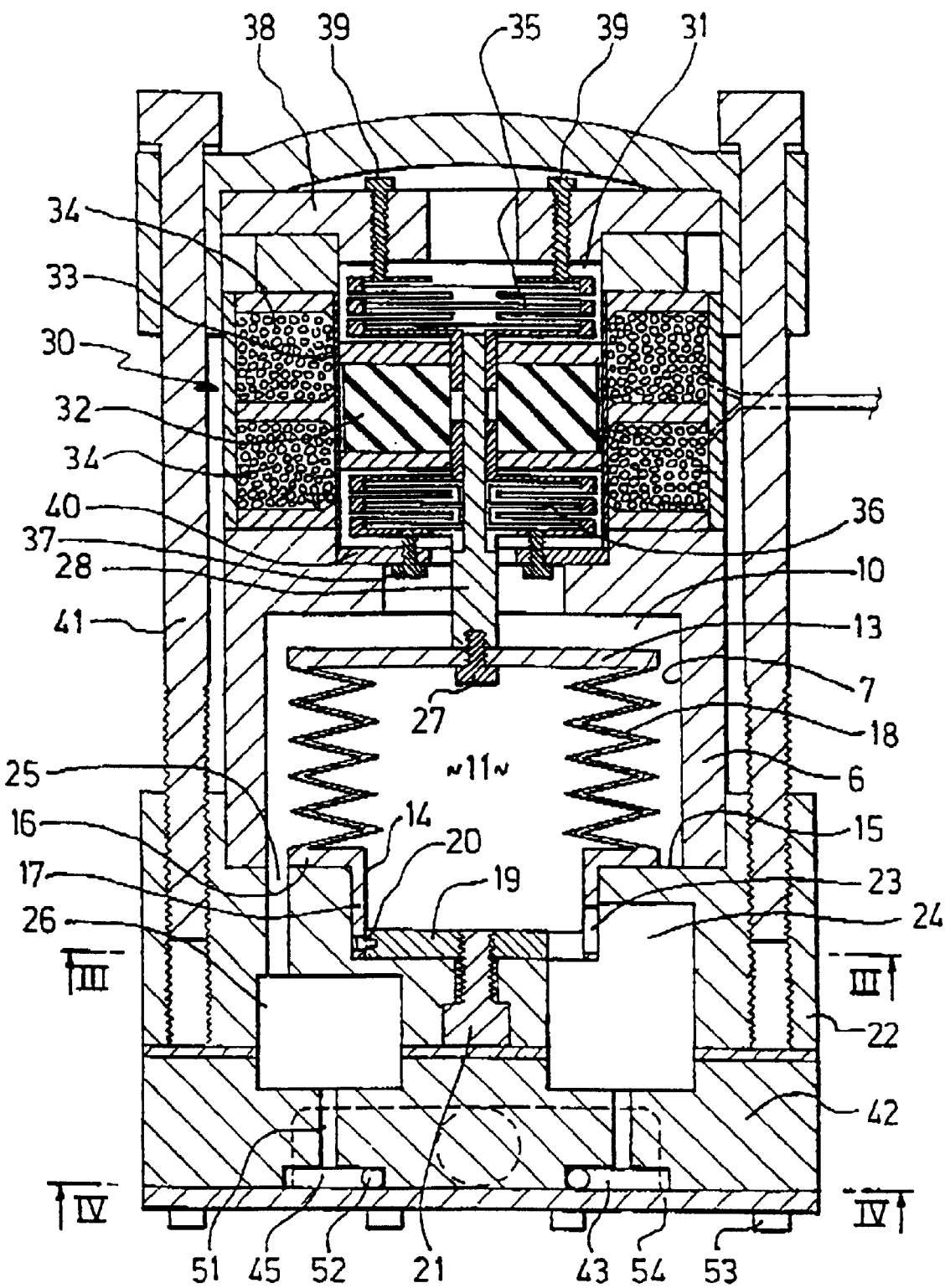
FIG. 2 is a schematic view in axial cross-section of the pump in FIG. 1.
Figure 3:
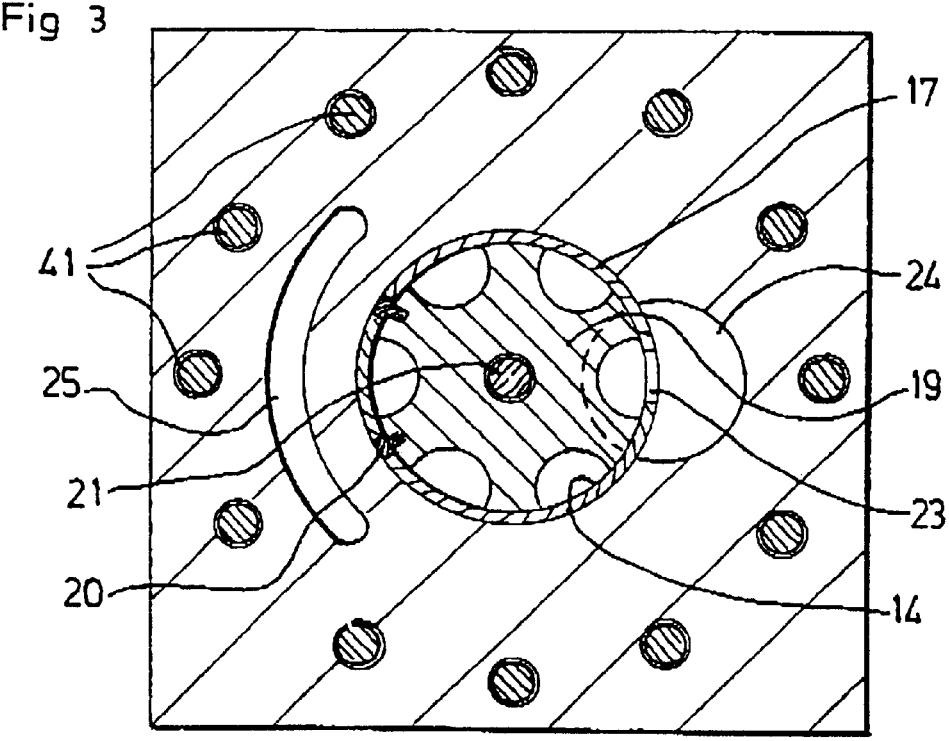
FIG. 3 is a schematic view in cross-section along the line III—III in FIG. 2.
Figure 4:
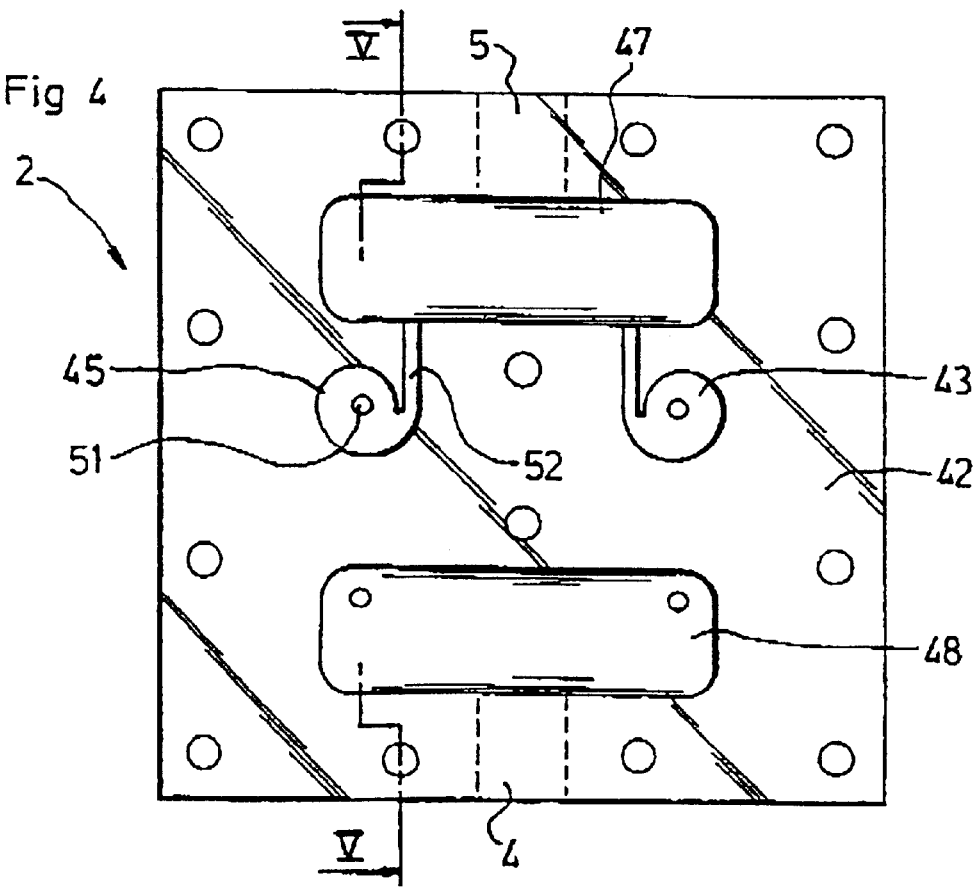
FIG. 4 is a schematic view in cross-section according to the line IV—IV in FIG. 2.
Figure 5:
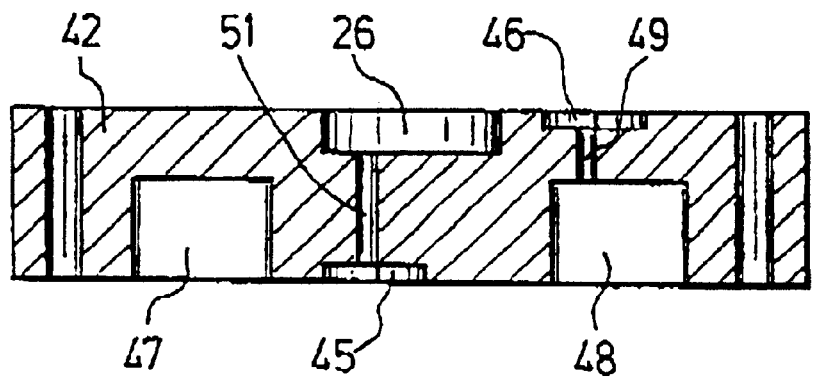
FIG. 5 is a schematic view in cross-section according to the line V—V in FIG. 4, of the manifold of the pump in FIG. 1.
Figure 6:
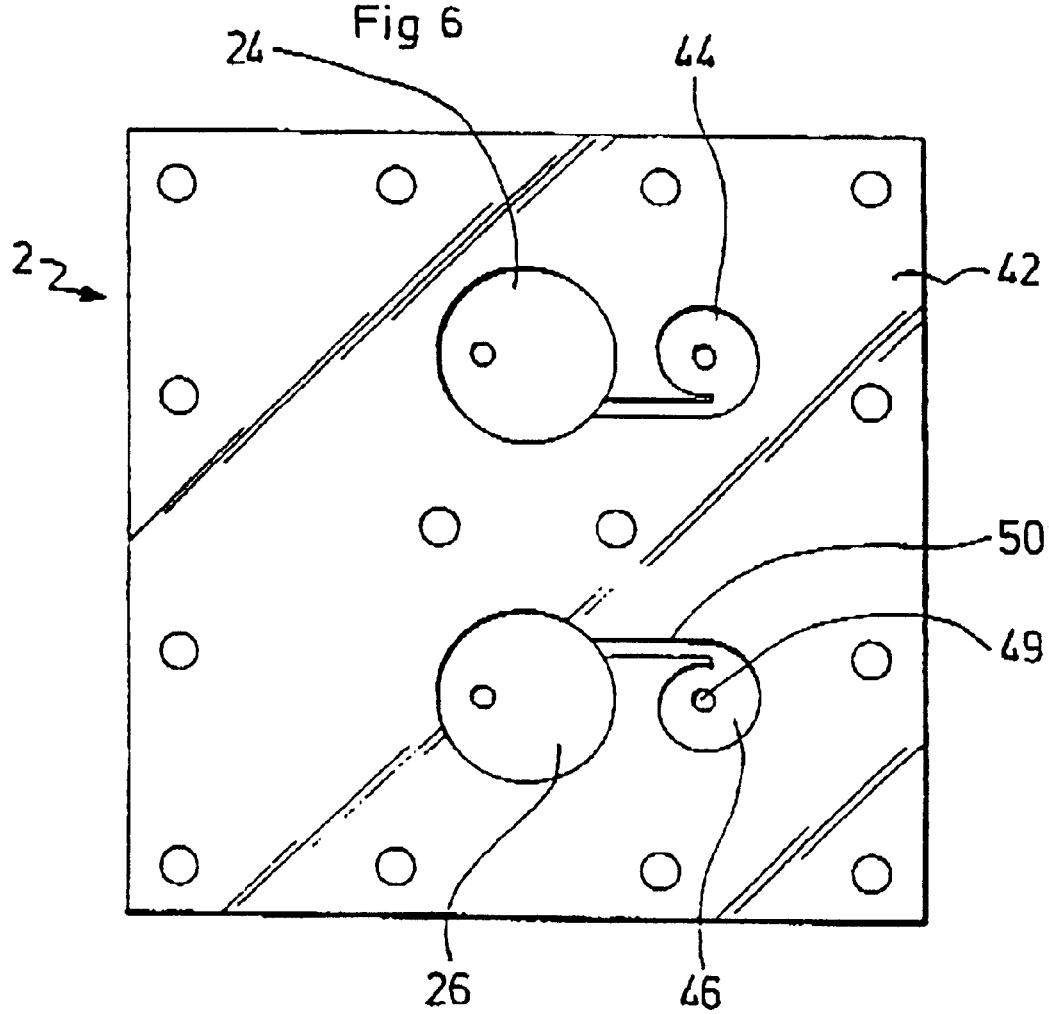
FIG. 6 is a schematic plan view of FIG. 5

The bellows 12 can for example comprise between five and fifty folds, and in particular between ten and twenty folds. The number of folds 18 of the bellows 12 depends on its general dimensions, the range of flow rate which the pump must deliver, and the characteristics of the material used. In particular, it should be noted that the greater the number of folds 18, the lower the resilient flexure stresses withstood by each fold 18 (for a specific nominal flow rate value and size). According to the characteristics of the material used, the number of folds 18 is determined such that the stress which is withstood by each fold 18 remains lower than the limit fatigue stress. Thus, it is ensured that no fatigue phenomenon can intervene and limit the service life of the pump. By way of non-limiting example, FIG. 2 shows bellows 12 which have five folds 18.

The end wall 13 of the bellows 12 is connected by a screw 27 to a control rod 28, which extends into the outer pumping chamber 10, and is secured such as to be integral in translation with an actuator unit 29 of an electromagnetic drive device 30 for operation of the bellows 12. The actuator unit 29 is disposed in an axial extension 31 of the outer pumping chamber 10. As well as communicating with the portion of the outer pumping chamber 10 which surrounds the bellows 12, this extension 31 is hermetically sealed. The actuator unit 29 consists of at least one ferromagnetic and/or magnetised part 32, which is secured integrally to the control rod 28. This part 32 is preferably symmetrical in revolution around the main axis of the control rod 28, which itself is coaxial relative to the main axis of symmetry of the bellows 12. Similarly, the extension 31 of the outer pumping chamber 10 is preferably symmetrical in revolution around the main axis of symmetry of the cylinder 6. The magnetised part 32 extends radially in the extension 31 of the chamber 10, until it comes into the immediate vicinity of a ferromagnetic portion 33 of the wall 7, such that a gap with a narrow radial thickness is provided between this portion 33 and the part 32.

Outside the portion 33 of the wall 7, i.e. outside the cylinder 6, the pump comprises two coils 34 which are arranged and designed to be able to control the displacements of the magnetised part 32 respectively in axial translation in one direction and in the other direction. The magnetised part 32 thus constitutes a mobile armature for the electromagnet, formed from the coils 34 and this part 32. By this means, electromagnetic energy is transmitted by induction through the portion 33 of wall 7, from the coils 34 outside the cylinder 6, to the magnetised part 32 in the cylinder 6, without any mobile or deformable part which passes through the wall 7, and without dynamic solid friction.

The actuator unit 29 is guided in axial translation in the extension 31 of the chamber 10, inside the cylinder 6, by two series 35, 36 of flexible plates, which are associated with the control rod 28 and the part 32, on both sides of this part 32, inside the extension 31 of the chamber 10. These flexible plates 35, 36 are designed to keep constant the thickness of the gap between the part 32 and the portion 33 of the wall 7 opposite, whilst permitting displacement in axial translation in both directions of the part 32, under the effect of the magnetic field created by the coils 34. The rigidity of the flexible plates 35, 36 in the axial direction is lower than that of the bellows 12 in this same axial direction of translation, such that all the drive energy is used to move the bellows 12. Each series 35, 36 of flexible plates is virtually non-deformable in the radial direction. For this purpose, each series of flexible plates 35, 36 consists for example of a stack of metal rings, which are connected to one another in pairs, in two diametrically opposite areas of connection. The areas of connection of the rings in pairs are disposed in diametral directions which are successively perpendicular relative to one another, from one axial end to the other of the stack thus formed.

The upper stack of flexible plates 35 (at the end of the pump body 1 which is opposite the manifold 2) is rendered integral with a cover 38 of the pump body 1, by means of screws 39, which are parallel to the axial direction. Similarly, the lower stack of flexible plates 36 (on the side adjacent to the bellows 12) is secured to a plate 40, which is rendered integral with the cylinder 6, by screws 37 which are parallel to the axial direction.

When the coils 34 are supplied with an alternating electrical voltage, the actuator unit 29 is displaced reciprocally in axial translation, and thus operates in reciprocal axial translation the bellows 12 to which it is connected.

The cover 38, the cylinder 6 and the base plate 22 are rendered integral with one another by a series of peripheral screws 41, which are engaged in the internal screw threads in the base plate 22.

The cavities 24, 26 into which the intake/output apertures 23, 25 open extend in communication with additional receptacles in a lower plate 42, which constitutes the manifold 2. The aperture 23 which constitutes the intake/output aperture which opens into the pumping chamber 10 outside the bellows 12, extends along a portion of sector around the bellows 12, which has a length sufficient for the efficient section of this aperture 23 to permit passage of the flow of liquid to be conveyed. In the example shown, this aperture 23 extends around the bellows 12 according to an arc which defines an angular sector of approximately 90°. Similarly, the aperture 25 which constitutes the intake/output aperture which communicates with the inner pumping chamber 11 has an efficient cross-section which corresponds to the flow to be conveyed.

Each cavity 24, 26, i.e. each intake/output aperture 23, 25 communicates with two fluid diodes respectively 43, 44 and 45, 46, i.e. a downstream fluid diode 43, 45 and an upstream fluid diode 44, 46, these fluid diodes 43 to 46 being formed in the plate 42 which constitutes the manifold 2.

The downstream fluid diodes are interposed between the corresponding cavity 24, 26, and the delivery end 5 of the piping 3, by means of a downstream accumulator cavity 47. The upstream fluid diodes 43, 45 are "through-putting" from the corresponding cavity 24, 26 towards the accumulator cavity 47, i.e. they are "through-putting" in the direction of flow of the fluid towards the delivery end 5. In the opposite direction, the downstream fluid diodes 43, 45 are "resistant". In other words, the fluid diodes 43, 45 allow the fluid to flow freely in the downstream direction towards the delivery end 5, and on the other hand stop delivery of the fluid in the opposite direction, i.e. coming from the delivery end 5.

The upstream fluid diodes 44, 46 are interposed, through the intermediary of an upstream accumulator cavity 48, between the suction end 4 of the piping 3 and each of the cavities 24, 26, i.e. each of the intake/output apertures 23, 25 in the pumping chambers 10, 11. In this case also, the upstream fluid diodes 44, 46 are through-putting in the direction of flow of the fluid in the piping 3, i.e. from the suction end 4 towards the cavities 24, 26, and are on the other hand resistant in the opposite direction.

The fluid diodes 43 to 46 are diodes of the vortex type, i.e. they consist of a main cylindrical cavity of revolution, an intake channel which is coaxial relative to the cylindrical cavity, and opens into the centre of the base of this cylindrical cavity, and an output channel, which communicates with, and opens tangentially into, the cylindrical cavity. When the fluid flows from the intake channel towards the output channel the diode is through-putting, i.e. it offers lower resistance. On the other hand, if the fluid tends to flow in the opposite direction, i.e. from the output channel towards the intake channel, it is forced to form a vortex within the main cavity, thus creating a loss of load, and resistance which decreases considerably, thus limiting the flow of the fluid in this direction.

For example, the upstream diode 46 has an intake channel 49 which opens into the upstream accumulator cavity 48, and an output channel 50 which opens into the cavity 26 which communicates with the intake/output aperture 25 of the outer pumping chamber 10. Similarly, the upstream fluid diode 44 comprises an intake channel which communicates with the upstream accumulator cavity 48, and an output channel which opens into the cavity 24 which communicates with the intake/output aperture 23 of the inner pumping chamber 11. These upstream diodes 44, 46 are recessed in the upper surface of the plate 42.

The downstream fluid diodes 43, 45 are on the other hand recessed relative to the lower surface of the plate 42 which forms the manifold 2. The downstream fluid diode 45 has an intake channel 51 which opens into the cavity 26 which communicates with the intake/output aperture 25 of the outer pumping chamber 10, and an output channel 52 which opens into the downstream accumulator cavity 47. The same applies to the downstream fluid diode 43, the intake channel of which opens into the cavity 24 which communicates with the intake/output aperture 23 of the inner pumping chamber 11, and the output channel of which opens into the downstream accumulator cavity 47.

The plate 42 is secured by screws 53 to the base plate 22. A base 54 covers the lower surface of the plate 42, in order to close the accumulator cavities 47, 48 and the downstream fluid diodes 43, 45.

Figure 7:
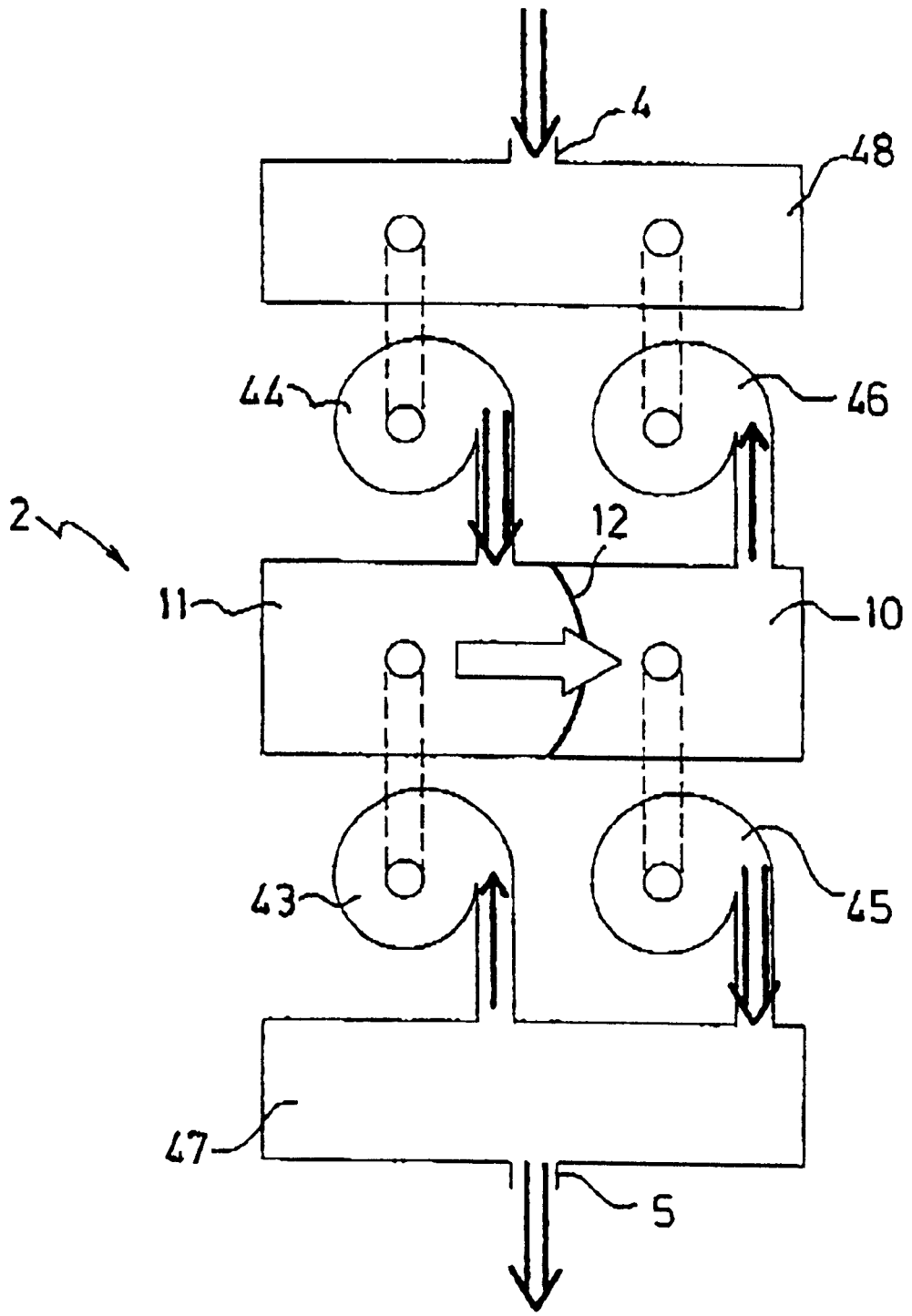
FIGS. 7 and 8 are diagrams which illustrate respectively the operation of the deformable pumping unit and of the fluid diodes, in each direction of displacement of the deformable pumping unit.

FIG. 7 shows operation of the manifold during expansion of the bellows 12, with the volume of the outer pumping chamber 10 decreasing, whereas the volume of the inner pumping chamber 11 is increasing. As can be seen, the fluid is pumped from the suction end 4 into the upstream accumulator cavity 48, and via the upstream fluid diode 44, which is through-putting into the inner pumping chamber 11, the volume of which is increasing. On the other hand, the downstream fluid diode 43, which is connected to the inner pumping chamber 11, prevents return of the fluid from the downstream accumulator cavity 47 into this chamber 11. The fluid which is present in the outer pumping chamber 10 is delivered by the downstream fluid diode 45, which is through-putting, into the downstream accumulator cavity 47, then into the delivery end of the piping 3. On the other hand, the upstream fluid diode 46 prevents return of the fluid from the chamber 10 to the upstream accumulator cavity 48.

Figure 8:
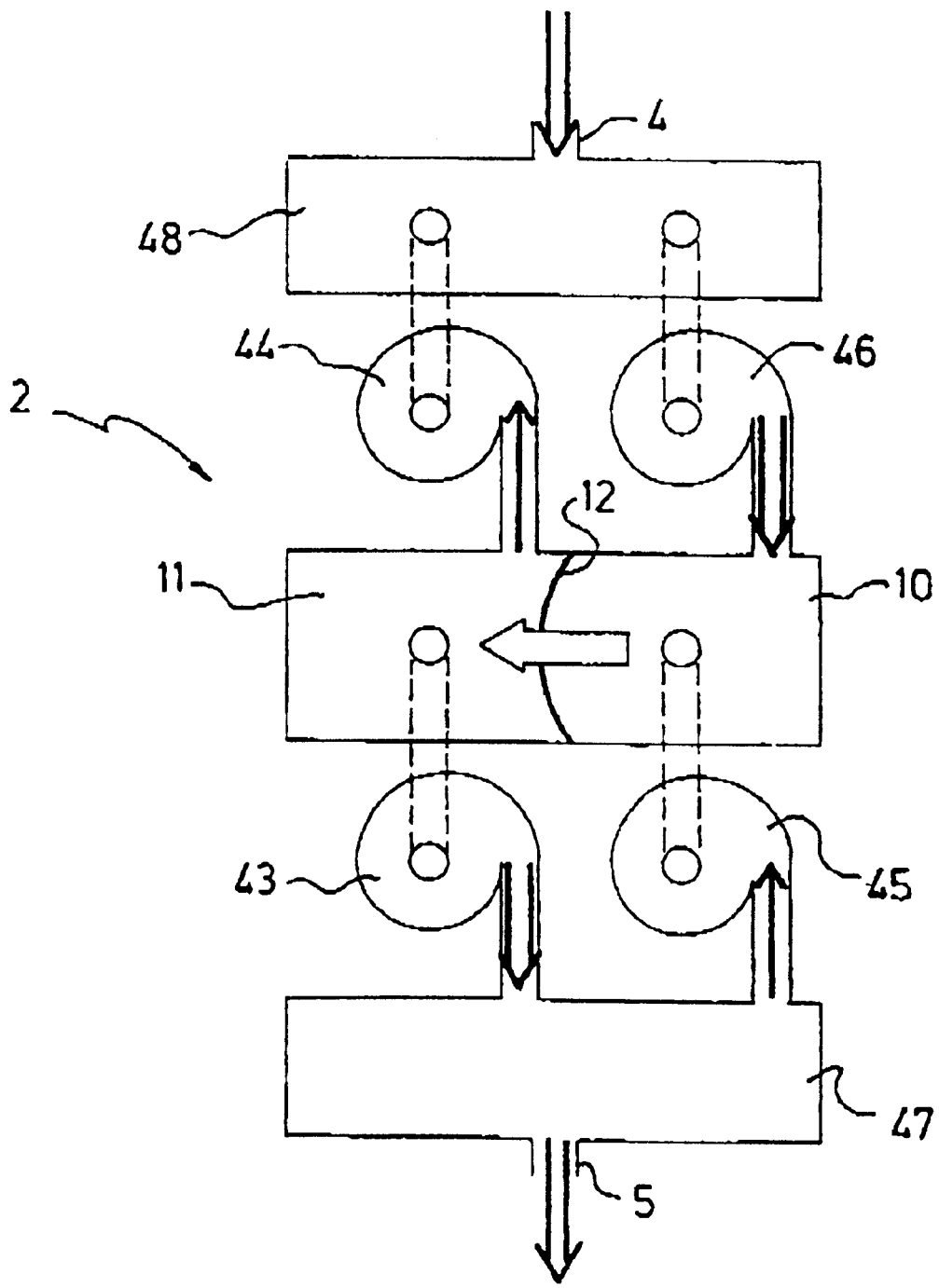

FIG. 8 shows the opposite position, corresponding to contraction of the bellows 12, with the volume of the inner chamber 11 decreasing, whereas the volume of the outer chamber 10 is increasing. The fluid diodes 44, 45 are resistant, whereas the fluid diodes 43, 46 are through-putting.

As can be seen, the pump according to the invention is a single-cylinder pump with single, double-effect pumping bellows 12, and comprises a manifold 2 with four fluid diodes.

The invention can form the basis of many variants compared with the embodiment shown in the figures. In particular, it should be noted that the pump shown in the figures has not been optimised for the purpose of its integration on a satellite. It is rather an experimental device, which makes it possible to evaluate and adjust the various characteristics and performance levels of the pump according to the invention. In practice, in order to produce a pump which can be integrated in a satellite, the pump does not need to be detachable, such that the number of parts can be reduced considerably. For example, bellows 12 can be purely and simply welded onto the base of the cylinder 6, and the assembly of the pump body can be formed in a single piece which is also welded onto the base plate 22, which itself is integral with the plate 42, and more generally with the manifold 2.

In order to adjust the flow rate provided by the pump in the piping 3, it is sufficient to vary the frequency of movements of the bellows by piloting the frequency of the electric voltage which is supplied to the coils 34.

The pump according to the invention is more particularly applicable to a thermal control loop with diphasic heat-transfer fluid, such as ammonia. The fluid which is pumped in the piping 3 is then a diphasic heat-transfer fluid of this loop. A thermal control loop of this type with diphasic fluid is already known (cf. for example, Architecture Méet Thermique "Cours de technologie spatiale" (Mechanical and Thermal Architecture "Space technology course"), Toulouse, Cepadues Editions, 1994, pp 437–453). More generally, the pump and thermal control loop with diphasic fluid according to the invention are applicable to any space system with a long service life (unmanned satellite for commercial, telecommunications or other purposes, space station etc.).

EXAMPLE

A pump prototype according to the invention has been produced with the following dimensions and characteristics: Diameter: 92 mm, length: 220 mm; electrical consumption: 15W; pressure lift: $3.10^4$ Pa, i.e. a pumping height of pproximately 3 m.

The service life of 10 to 15 years of the pump can be proved by accelerated tests on the ground, lasting approximately one year, completed by theoretical analyses.

A pump according to the invention can be qualified for being put on board a space system, and is designed for pumping of the diphasic fluid of a thermal control loop with diphasic fluid.

FIG. 9 shows an example of a thermal control device according to the invention, comprising a thermal control loop 60 with diphasic fluid such as ammonia, supplied from a diphasic pressurising tank 61, the output 62 of which is connected to a duct 63 which is connected to a pump 64 according to the invention. In this duct 63, the fluid is monophasic fluid. The pump 64 supplies the fluid in the fluid state under pressure to an evaporator unit 65, which is designed to receive the thermal power (calories) released by the exothermal components 66 (for example the electronic circuits) of the space system. At the output of the evaporator unit 65, the fluid is conveyed in the fluid/gas diphasic state, according to the power absorbed, into a duct 67 which is connected to a group of condensers 68, which supply the fluid in the fluid state to the duct 63 upstream from the output 62 of the tank 61, with extraction of the thermal power towards a cold source.

What is claimed is:

1. A positive displacement pump, comprising:
    a housing with an interior containing two pumping chambers that are separated by a deformable pumping bellows, a first of said pumping chambers being inside said bellows and having a first port, a second of said pumping chambers being outside said bellows and having a second port, said housing having a seal that hermetically seals said interior except at said first and second ports, said first and second ports passing a fluid to be pumped;
    a driver having a coil outside said interior and a ferromagnetic or magnetized actuator inside said interior and connected to said bellows, said coil transmitting electromagnetic energy by induction to said actuator during operation of the pump to reciprocally displace said bellows to pump fluid through said first and second ports; and
    a manifold having a fluid intake, a fluid output, and plural vortex fluid diodes that are in fluid communication with said first and second ports and said fluid intake and output.

2. The pump of claim 1, wherein said bellows comprises coaxially connected metal rings.

3. The pump of claim 1, wherein said actuator is in an axial extension of said second pumping chamber.

4. The pump of claim 1, wherein said actuator comprises a ferromagnetic or magnetized movable part, said bellows comprises an end plate, and said movable part is connected to said end plate with a rod, and wherein said movable part, said end plate, and said rod move together to reciprocally displace said bellows.

5. The pump of claim 1, wherein said actuator comprises flexible plates at axial ends thereof, said flexible plates having an axial rigidity that is less than that of said bellows.

6. The pump of claim 1, comprising two pairs of said vortex fluid diodes in said manifold, each of said pairs comprising an upstream one of said fluid diodes interposed between a respective one of said first and second ports and said fluid intake and a downstream one of said fluid diodes interposed between the respective one of said first and second ports and said fluid output.

7. The pump of claim 1, further comprising an upstream accumulator in fluid communication with said fluid intake that temporarily stores fluid to be pumped and a downstream accumulator in fluid communication with said fluid output that temporarily stores fluid that has been pumped.

8. The pump of claim 1, wherein said driver is arranged and constructed to operate at a frequency of 1 Hz to 50 Hz.

* * * * *